Jan. 6, 1970    C. R. HERMAN ET AL    3,487,550
ADJUSTABLE GRADE SETTING RULE
Filed Dec. 13, 1967    2 Sheets-Sheet 1
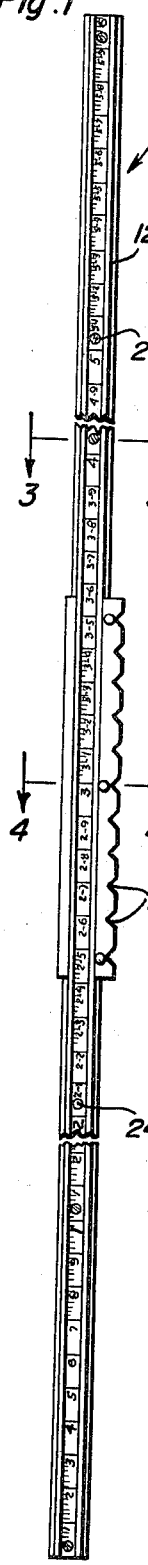
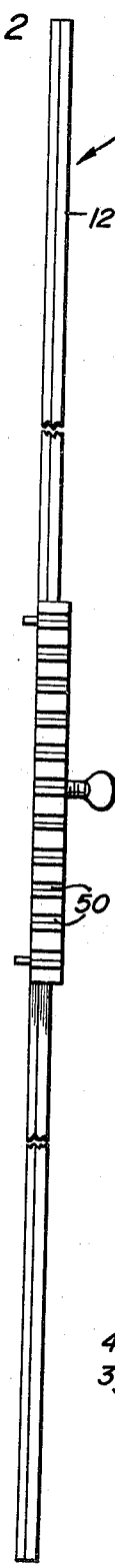
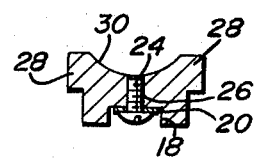
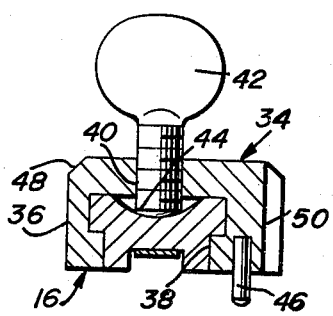
Clarence R. Herman
Martin A. Teeling
INVENTORS Jan. 6, 1970    C. R. HERMAN ET AL    3,487,550
ADJUSTABLE GRADE SETTING RULE
Filed Dec. 13, 1967    2 Sheets-Sheet 2

Clarence R. Herman
Martin A. Teeling
INVENTORS

# United States Patent Office 3,487,550
Patented Jan. 6, 1970

3,487,550
ADJUSTABLE GRADE SETTING RULE
Clarence R. Herman, 1916 Halterman St., Santa Cruz,
Calif. 95060, and Martin A. Teeling, 4844 Porter
Gulch Road, Aptos, Calif. 95003
Filed Dec. 13, 1967, Ser. No. 690,722
Int. Cl. G01c 5/02
U.S. Cl. 33—73                                    6 Claims

ABSTRACT OF THE DISCLOSURE

A measuring rod including a recess therein for receiving a rule. An adjustable sleeve is adapted to slide longitudinally along the length of the measuring rod, the sleeve including notches or grooves formed on one surface thereof. A tubular sight including a level and cross hairs for accurately sighting a marker is adapted to be positioned in a preselected notch which establishes a line of sight through the tubular sight. The adjustable sleeve includes a thumbscrew therein which permits the sleeve to be fastened along a preselected length of the measuring rod. The present measuring rod may be utilized in a method to establish grades for cutting of subgrades for sidewalks, curbs, gutters and roadways. In addition, the rod may be employed for bringing down roadway and excavation slopes within given tolerances.

---

The prior art has developed measuring devices for establishing grades for the cutting of subgrades for sidewalks and the like. Other previous constructions have been employed for bringing down roadway and excavation slopes within selected tolerances. However, the prior art generally requires separate measuring devices for accomplishing the aforementioned procedures. Further, a majority of surveying instruments utilized in the aforementioned procedures depend upon a time-consuming setup including a surveyor's transit. It may be stated that a number of these prior devices require a different marking boot for each grade. This multiplicity in the number of boots introduces a chance of measuring error as well as increasing the time element. In conventional surveying instruments, it is necessary to repeatedly remove one's eye from the line of sight directed toward a boot in order to adjust instrument settings. This becomes a laborious and time-consuming procedure which results in an economic loss of time.

Briefly summarizing the present invention, a measuring rod includes a rule fastened to one side thereof. An adjustable sleeve is positioned in sliding relation along the length of the rod. A thumbscrew is secured within the adjustable sleeve, the screw being capable of engaging the measuring rod thereby securing the sleeve in a preselected position along the length of the rod. In the present invention, grooves or notches are formed along one surface of the adjustable sleeve, these grooves being adapted to receive the tubular surface of a hand held sight. The notches are positioned along the length of the adjustable sleeve at one tenth foot intervals so that a displacement of a sight from one groove to another may be calculated in terms of distance by merely counting the number of notches traversed by the sight.

The aforementioned device may be utilized in bringing down roadway and excavation slopes within preselected tolerances by sequentially and alternately measuring off horizontal and vertical distances with the measuring rod that will result in a preselected slope. The present invention is also employed in establishing grades for the cutting of subgrades for sidewalks, curbs, gutters, roadways and the like by measuring vertical distances with the aforementioned sight when the sight is placed in a notch in the adjustable sleeve, the adjustable sleeve being placed along a predetermined vertical length on the rod. A vertical frame of reference is established with a marker stake positioned at a predetermined vertical distance from the flow line of a desired grade. This latter process requires but one marker to "shoot" any number of grades thereby introducing less chance of error and far greater economy of time. Accordingly, among the salient objects of the present invention are to provide:

A grade setting rule capable of establishing grades for the cutting of subgrades for sidewalks, curbs, gutters, roadways and the like;

A grade setting rule for bringing down roadway and excavation slopes within given tolerances, this grade setting rule being the same fabrication as that recited in the previous object;

Notches on an adjustable sleeve to permit the adjustment of settings on a grade setting rule by merely counting the notches without requiring the eye to be removed from the sight, the latter being directed at a boot.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a front elevational view of the present adjustable grade setting rule.

FIGURE 2 is a side elevational view of the rule shown in FIGURE 1, this particular figure illustrating notches formed within an adjustable sleeve.

FIGURE 3 is a transverse sectional view taken along a plane passing through section line 3—3 of FIGURE 1.

FIGURE 4 is a transverse sectional view taken along a plane passing through section line 4—4 of FIGURE 1.

FIGURE 5 is a sectional perspective exploded view illustrating the structure of an adjustable sleeve slidably mounted upon the grade setting rule, the view also illustrating the orientation of a sight within a notch in the sleeve.

FIGURE 6 is a diagrammatic view illustrating how the present invention is utilized to establish grades for the cutting of subgrades for sidewalks, curbs, gutters, roadways and the like.

Figure 6:
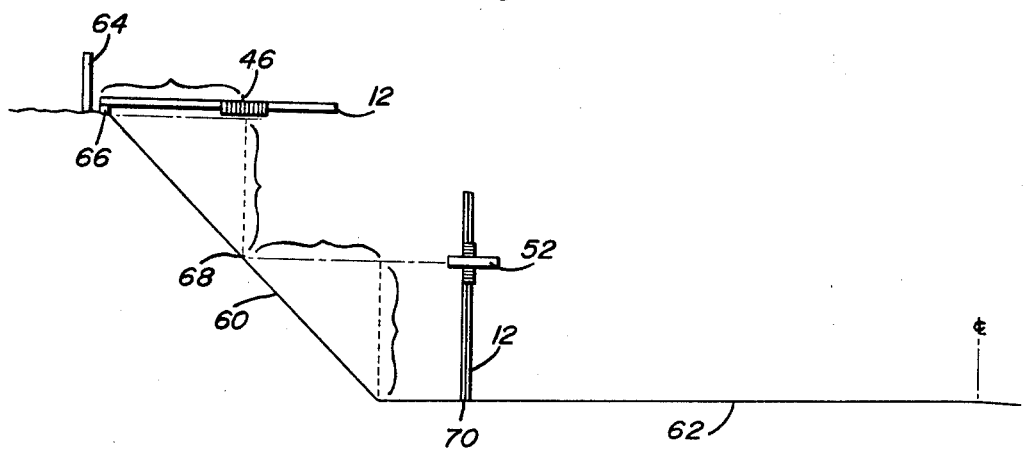

Referring to the drawings, the preferred structural embodiment of the present invention includes a measuring rod and adjustable sleeve thereon to form an adjustable grade setting rule as represented by reference numeral 10 and shown in FIGURES 1 and 2 of the drawings. Referring specifically to FIGURE 5, the embodiment includes a measuring rod or staff 12 which may be characterized by a generally rectangular cross-section as denoted by reference numeral 14. One side 16 of the rod 12 is referred to as the front side for purposes of describing the structure. A rectangular recess 18 is longitudinally formed within the front side 16. A rule 20 is positioned within the recess, the rule being inscribed with the indicia 22 of an engineer's scale marked off in tenths of a foot. FIGURE 3 clearly shows the disposition of the rule within the rod. As seen in that figure, the rule is fastened within the recess by means of suitable fasteners 24 which are threadably engaged in an aperture 26 coincidentally formed through preselected points along the length of the rule, each aperture extending through the rule and the rod from the front to the rear of the same. As FIGURES 3 and 5 illustrate, the rod includes integrally appending rectangular projections 28 extending laterally from the sides of the rod. The rear side of the rule is characterized by an elongated concave recess 30.

An adjustable sleeve 34 is slidably positioned along the length of the rod 12. An inspection of FIGURE 4 demonstrates that the cross-section 36 of the sleeve may be regarded as generally rectangular. An elongated T-shaped recess 38 is formed inwardly of the front side 16 to accommodate the cross-sectional profile of the interiorly situated rod. A threaded aperture 40 is formed within the rear side of the adjustable sleeve 34 along a point intermediate the longitudinal ends of the adjustable sleeve. A thumbscrew 42 is threadably inserted within the aperture 40 and extended therein to engage the outwardly disposed concave recess 30, the latter being formed in the rear side of the rod as previously mentioned. In actual operation of the device, the sleeve may be slidably adjusted along the length of the rod by unscrewing the thumbscrew 42 and manually changing the position of the adjustable sleeve 34 after which time the thumbscrew may be tightened thereby fastening the position of the adjustable sleeve on the rod. It is noted in FIGURE 4 of the drawings, that the end of the thumbscrew 42 includes a chamfer 44 to smoothly engage the aforementioned concave recess. The front side of the adjustable sleeve includes three index pins 46 vertically aligned and disposed adjacent the outwardly disposed notches and the medially disposed notch for the purposes to be explained hereinafter. Continuing to refer to FIGURE 4, it is noted that the edge formed by the rear side and the lateral side of the adjustable sleeve opposite the lateral side containing the aforementioned notches is characterized by an elongated chamfer 48.

Referring to FIGURES 1–3, it may be seen that one side of the adjustable sleeve 34 includes a series of longitudinally aligned V-shaped slots or notches 50. FIGURE 5 clearly illustrates that each notch is displaced from an adjacent notch by intervals of one tenth of a foot. Thus, a surveyor's sight or hand-level 52 may be positioned within a reference notch then moved upwardly or downwardly along the adjustable sleeve with the user being aware of the dimensional displacement of the sight by merely counting the number of notches traversed by the sliding sight. The specific construction of the sight 52 includes a level 54 appending from the outer cylindrical wall of the sight. Accuracy in sighting is increased by utilizing cross hairs (not shown) within the interior lens structure. As viewed in FIGURE 5, the front side of the adjustable sleeve 34 includes numerical indicia 56 inscribed adjacent a number of the aforementioned notches. The indicia represents an incremental change in the linear dimension from one notch to another. It will be appreciated that if so desired, representative indicia may be inscribed adjacent each and every notch on the adjustable sleeve. The word "Fill" is inscribed on the same side as the aforementioned indicia but at an opposite edge thereof. The word is located above the medially disposed notch. The word "Cut" is inscribed longitudinally below and in longitudinal alignment with the word "Fill." These inscribed words are represented by the reference numeral 58 and serve as a direction to the instrument user as to what earth moving procedure must be followed in accordance with the method explained hereinafter.

FIGURE 6 demonstrates the use of the present invention for bringing down roadway and excavation slopes within preselected tolerances. For purposes of example, it will be assumed that a slope 60 is to be excavated with an eight foot vertical drop at a ratio of one-to-one. The procedure to be followed is as follows: the center or medially disposed index pin 46 on the adjustable sleeve is set to four feet on the main rod rule 12. A surveyor's hub 66 is positioned immediately adjacent a marker stake 64. The measuring rod is placed in a horizontal position extending outwardly from the hub 66 upon which the zero gradation of the rod rests. A plumb line is dropped through the medially disposed notch in the adjustable sleeve 34 which is set on the four foot mark. The point at which the plumb falls is generally denoted by reference numeral 68. In accordance with the present procedure the surveyor's hub 66 is placed at this point. The measuring rod is now placed upon this newly located hub at point 68 and the "plumb down" operation is repeated in the same manner as previously discussed. In order to establish a vertical elevation of the hub at point 68 equal to four feet, the measuring rod 12 is removed from the hub and placed upon the roadway 62 at a point denoted by reference numeral 70. In this position, the "zero" end of the rod is placed downwardly while the sight 52 is positioned within a notch that permits a level viewing of the hub positioned at point 68. In order to determine whether or not a fill or cut operation upon the slope is necessary, the notch within which the sight is located is compared with the words 58 "Fill" and "Cut" and the extent of this operation is computed on the basis of the displacement of this notch from the medially disposed index pin. After the aforementioned fill or cut operation has taken place and the hub replaced to a new point vertically aligned with its original disposition but vertically displaced in accordance with the fill or cut procedure, a new sighting is made as previously described by the measuring rod placed at point 70 on the roadway. Accordingly, the elevation of the hub at 68 is changed after checking by means of sightings through the sight 52. The checking procedure and subsequent fill and cut operations are repeated until the sight is properly positioned in the notch next to the medially disposed index pin which remains set at four feet.

Figure 7:
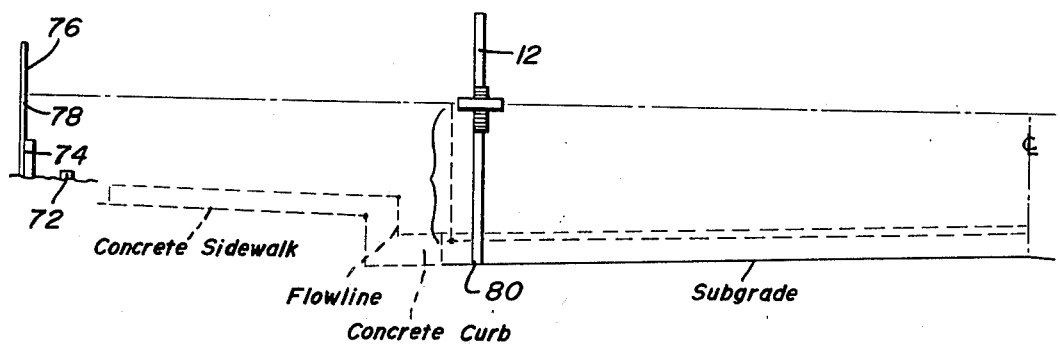
FIGURE 7 is a diagrammatic view illustrating how the present invention is employed in bringing down roadway and excavation slopes within given tolerances.

As seen in FIGURE 7, the present invention may also be utilized to establish grades for the cutting of subgrades for sidewalks, curbs, gutters, roadways and the like. The instant measuring rod device is employed in conjunction with a hub 72, marker stake 74, and lathe 76 all of which are set by surveyors. For purposes of example, a three foot boot 78 is set on the lathe above the flow line (or in some cases, the top of a curb). The procedure is as follows: the rod 12 is positioned at a point 80, with the "zero" end of the rod facing downwardly. This point may be any conventional reference point at which earth is to be moved. The medially disposed index pin 46 on the adjustable sleeve is positioned to coincide with the "cut" for point 80 by means of first unscrewing the thumbscrew 42 as seen in FIGURES 4 and 5 of the drawings then fastening the screw once the proper position on the rod has been attained. Starting with the sight at the notch corresponding to the medially disposed pin, the sight is moved upwardly or downwardly until it clicks into a notch horizontally aligned with the boot set at three feet on the lathe. By noting the number of clicks accompanied by the upwardly or downwardly motion of the sight, it becomes unnecessary to visually note the displacement of the sight with respect to the scale on the measuring rod. After sighting the three foot boot, the number of tenths of a foot cut or fill is noted by simply noting the number of clicks accompanying the traverse of the sight from the medially disposed notch to the finally attained notch. An equipment operator is advised as to the appropriate earth moving procedure after which time the aforementioned procedure is repeated for each reference point of the excavation including reference points for a sidewalk, curb, gutter and the like. It will of course be appreciated that the aforementioned rocedure is repeated for each subsequent reference point after setting the adjustable sleeve to the cut desired at that point. It is to be noted that this procedure does not require a new boot to be set nor a new lathe to be marked for each setting or cut desired.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An adjustable grade setting rule comprising a rod, a measuring scale attached to said rod along the length thereof, sleeve means slidably mounted along the length of said rod and including a plurality of longitudinally aligned notches formed therein, a surveyor's sight being removably retained in a preselected notch by application of manual force, each notch being displaced an integral number of units of length from the remaining notches, said sleeve means further including a reference point thereon for permitting sightings to be made from points relative to said reference point, said reference point being aligned with a preselected point on said measuring scale, and means for securing said sleeve means to said rod along a preselected length thereof.

2. The apparatus as set forth in claim 1 wherein said means for securing said sleeve means to said rod includes an aperture formed through said sleeve, a thumbscrew adapted for threaded passage through said aperture, the threaded end of said thumbscrew adapted for bearing engagement against a confronting surface of said rod thereby frictionally securing said sleeve means to said rod.

3. The apparatus as set forth in claim 2 together with first indicia on an outward surface of said sleeve, said indicia including a plurality of numerical symbols, each said symbol being disposed adjacent preselected notches, second indicia on said outward surface representing a first zone of said notches disposed above said medially situated notch, and third indicia below said second indicia for representing a second zone of said notches disposed below said medially situated notch.

4. A method for establishing grades for the cutting of subgrades, the steps including, establishing a first preselected point where earth is to be moved, establishing a second elevated reference point, disposing a measuring rod uprightly upon a point vertically colinear of said first preselected point where earth is to be moved, setting a variable indicator along the length of said rod to a length equal to the height of said second elevated reference point above said first preselected point, horizontally positioning a sight in perpendicular abutting relationship of said measuring rod adjacent said variable indicator, moving said horizontally positioned sight along the length of said rod until said sight is aligned with said second elevated reference point, noting the differential distance said sight is moved, subjecting the earth at said first preselected point to earth moving in a manner decreasing said differential distance to zero, and reiterating said aforementioned steps until said aforementioned differential distance equals zero commencing with the horizontal positioning of said sight in abutting relationship of said measuring rod adjacent said variable indicator.

5. The method of bringing down an excavation slope to a preselected value including the steps of extending a measuring rod horizontally outwardly from the top edge of a downwardly and outwardly excavated slope, preselecting a dimensional point along the length of said horizontally positioned measuring rod, projecting said point vertically downward upon said slope, reiterating said preselection and projection of a dimensional point from said first projected point on said slope, projecting a horizontal line of sight from a preselected height above the bottom of said slope, said line of sight being directed toward said slope to a point vertically aligned with said first projected point, determining the differential distance between said first projected point and said line of sight point, and vertically displacing said first projected point in a manner decreasing said differential distance to zero.

6. The method set forth in claim 5 together with steps for establishing grades for the cutting of subgrades appending from said excavated slope, said latter steps including establishing a first preselected point where earth is to be moved, establishing a second elevated reference point, disposing a measuring rod uprightly upon a point vertically colinear of said first preselected point where earth is to be moved, setting a variable indicator along the length of said rod to a length equal to the height of said second elevated reference point above said first preselected point, horizontally positioning a sight in perpendicular abutting relationship of said measuring rod adjacent said variable indicator, moving said horizontally positioned sight along the length of said rod until said sight is aligned with said second elevated reference point, noting the differential distance said sight is moved, subjecting the earth at said first preselected point to earth moving in a manner decreasing said differential distance to zero, and reiterating said aforementioned steps until said aforementioned differential distance equals zero commencing with the horizontal positioning of said sight in abutting relationship of said measuring rod adjacent said variable indicator.

References Cited

UNITED STATES PATENTS

| | | | |
|---|---|---|---|
| 1,199,355 | 9/1916 | Edmiston | 33—88 |
| 1,804,421 | 5/1931 | Klopsteg | |
| 2,093,049 | 9/1937 | Leavitt | 33—73 X |

HARRY N. HAROIAN, Primary Examiner